(12) United States Patent
Teal et al.

(10) Patent No.: US 11,597,525 B2
(45) Date of Patent: Mar. 7, 2023

(54) ATTENUATORS FOR AIRCRAFT CABLE AND EJECTION SEAT ARM RESTRAINT ASSEMBLIES

(71) Applicant: AMI Industries, Inc., Colorado Springs, CO (US)

(72) Inventors: Cyle Teal, Colorado Springs, CO (US); Neil Cross, Peyton, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/217,109

(22) Filed: Mar. 30, 2021

(65) Prior Publication Data

US 2022/0315229 A1  Oct. 6, 2022

(51) Int. Cl.
| | | |
|---|---|---|
| *B64D 25/10* | (2006.01) | |
| *B64D 25/06* | (2006.01) | |

(52) U.S. Cl.
CPC ............ *B64D 25/10* (2013.01); *B64D 25/06* (2013.01)

(58) Field of Classification Search
CPC ........ B64D 25/02; B64D 25/04; B64D 25/06; B64D 25/10; F16F 15/13453; F16F 1/128
See application file for complete search history.

(56) References Cited

U.S. PATENT DOCUMENTS

| | | | | |
|---|---|---|---|---|
| 3,214,117 A | * | 10/1965 | James ..................... | B64D 25/02 297/452.56 |
| 3,968,863 A | * | 7/1976 | Reilly ..................... | F16F 7/123 188/372 |
| 4,081,156 A | * | 3/1978 | Ideskar .................. | B64D 25/02 244/122 AG |
| 4,215,835 A | * | 8/1980 | Wedgwood ............ | B64D 25/02 244/122 AG |
| 4,567,977 A | | 2/1986 | Fisher | |
| 4,592,523 A | * | 6/1986 | Herndon ................ | B64D 25/02 297/216.12 |
| 4,681,303 A | * | 7/1987 | Grassano .............. | A01K 27/005 267/113 |
| 5,232,207 A | * | 8/1993 | Champ ................... | F16F 1/128 74/501.5 R |
| 5,415,366 A | * | 5/1995 | Mastrolia ............... | B64D 25/02 244/122 AG |
| 8,485,471 B2 | | 7/2013 | Patterson et al. | |

(Continued)

FOREIGN PATENT DOCUMENTS

| | | | | | |
|---|---|---|---|---|---|
| GB | 2397865 A | * | 8/2004 | .......... | B60N 2/4242 |
| GB | 2475371 | | 5/2011 | | |

OTHER PUBLICATIONS

United Kingdom Intellectual Property Office, United Kingdom Search Report dated Sep. 26, 2022 in Application No. GB2204534.8.

*Primary Examiner* — Joshua J Michener
*Assistant Examiner* — Ryan Andrew Yankey
(74) *Attorney, Agent, or Firm* — Snell & Wilmer L.L.P.

(57) ABSTRACT

An arm restraint assembly for an ejection seat may comprise a primary arm configured to pivot about a primary arm pivot joint, a first cable portion coupled to the primary arm, and an attenuator coupled to the first cable portion. The first cable portion may be configured to pivot the primary arm about the primary arm pivot joint. The attenuator may include a housing and a plunger having a head located in the housing. The head of the plunger may be biased toward a first end of the housing.

6 Claims, 9 Drawing Sheets

(56) References Cited

U.S. PATENT DOCUMENTS

| | | |
|---|---|---|
| 10,486,818 B2 | 11/2019 | Volny et al. |
| 11,077,950 B2 * | 8/2021 | Teal ........................ B64D 25/10 |
| 11,414,197 B2 * | 8/2022 | Stribrny ................. B64D 25/04 |
| 2010/0109215 A1 | 5/2010 | Ruthinowski et al. |
| 2011/0114790 A1 * | 5/2011 | Patterson ............... B64D 25/10 |
| | | 244/122 AG |
| 2011/0278778 A1 * | 11/2011 | Qattan ...................... F16F 3/00 |
| | | 267/171 |

* cited by examiner

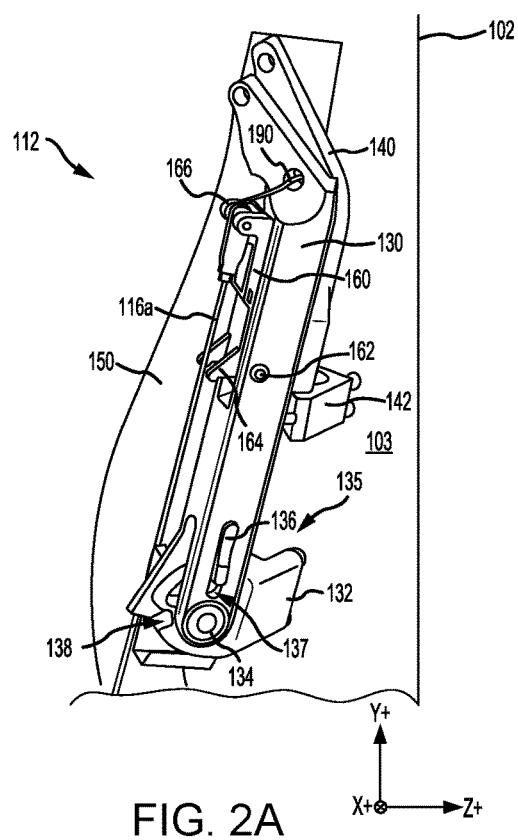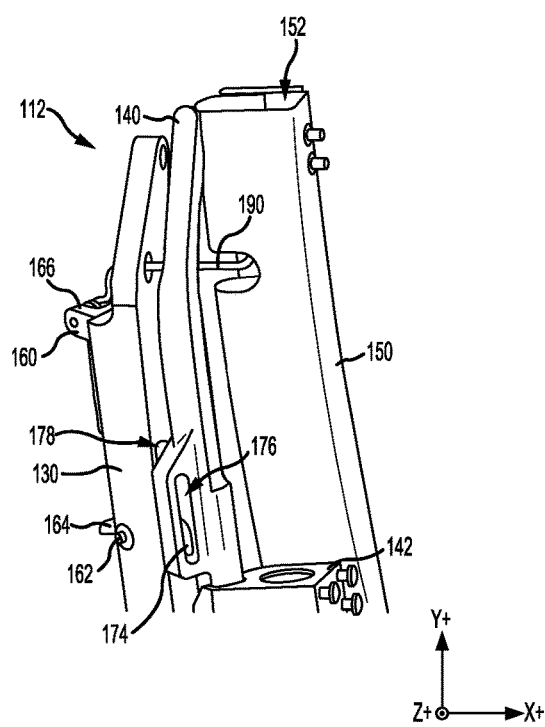
FIG. 2A
FIG. 2B

ATTENUATORS FOR AIRCRAFT CABLE AND EJECTION SEAT ARM RESTRAINT ASSEMBLIES

FIELD

The present disclosure relates to attenuators and, more specifically, to attenuators for aircraft cable and ejection seat arm restraint assemblies.

BACKGROUND

Ejection systems are designed to expel ejection seats and the seat occupants from an aircraft cockpit. Upon ejection from the cockpit, the seat and the seat occupant enter the wind stream (also referred to as a "windblast") at the surface of the aircraft canopy. Current ejection seats may include an arm restraint assembly that restricts rearward movement of the seat occupant's arms. The arm restraints are configured to deploy upon initiation of the ejection sequence such that the arm restraints will be located behind (i.e., aft of) the seat occupant's arms prior to the seat occupant entering the wind stream.

Existing arm restraints typically include an aircraft cable coupled between the arm restraint and a stationary structure in the aircraft (e.g., the floor). This coupling is configured to rotate the arm restraint to the deployed position in response to the ejection seat translating away from the stationary structure. The arm restraint then separates from the stationary structure as the seat continues to translate away from the stationary structure. For example, a sheer pin coupling the aircraft cable to the arm restraint may break (i.e., sheer) in response to the seat translating a threshold distance away from the stationary structure, thereby separating the arm restraint from the stationary structure. However, if too great a load is applied to the sheer pin too quickly (i.e., if there is a "load spike"), the sheer pin may break before the arm restraint is fully deployed and/or in a locked position. If the arm restraint does not fully deploy, the seat occupant's arms may be unrestrained upon entering the windblast, thereby increasing the risk of injury to the seat occupant.

SUMMARY

An arm restraint assembly for an ejection seat is disclosed herein. In accordance with various embodiments, the arm restraint assembly may comprise a primary arm configured to pivot about a primary arm pivot joint, a first cable portion coupled to the primary arm, and attenuator coupled to the first cable portion. The first cable portion may be configured to pivot the primary arm about the primary arm pivot joint. The attenuator may include a housing and a plunger having a head located in the housing. The head of the plunger may be biased toward a first end of the housing.

In various embodiments, the first cable portion may be located in a first cable opening defined by the first end of the housing. In various embodiments, a biasing member may be located in the housing. The biasing member may be configured to bias the head of the plunger toward the first end of the housing.

In various embodiments, a second cable portion may be coupled to the plunger. In various embodiments, the plunger may further comprise a shaft extending from the head of the plunger. The second cable portion may be located in a second cable opening defined by the shaft.

In various embodiments, a load cell may be coupled between the plunger and the second cable portion. In various embodiments, the second cable portion may be located in a second cable opening defined by the load cell.

An ejection seat is also disclosed herein. In accordance with various embodiments, the ejection seat may comprise a seat back and an arm restraint assembly coupled to the seat back. The arm restraint assembly may comprise a primary arm configured to pivot relative to the seat back, a first cable portion coupled to the primary arm and configured to pivot the primary arm about a primary arm pivot joint, and an attenuator coupled to the first cable portion. The attenuator may include a housing and a plunger located, at least partially, in the housing. A head of the plunger may be biased toward a first end of the housing.

In various embodiments, the arm restraint assembly may further comprise a second cable portion coupled to the plunger. In various embodiments, the attenuator may further comprise a retaining ring located in the housing, and a biasing member located between the retaining ring and the head of the plunger.

In various embodiments, an anchor may be coupled to the second cable portion. The anchor may be configured to attach to a stationary structure.

In various embodiments, the first cable portion may be located in a first cable opening defined by a first end of the housing. In various embodiments, the plunger may further comprise a shaft extending from the head. The second cable portion may be located in a second cable opening defined by the shaft.

In various embodiments, the arm restraint assembly may further comprise a load cell coupled to the attenuator. The load cell may be configured to measure a tension of the first cable portion. In various embodiments, the arm restraint assembly may further comprise a second cable portion coupled to the plunger. The load cell may be coupled between the plunger and the second cable portion.

An attenuator for an aircraft cable assembly is also disclosed herein. In accordance with various embodiments, the attenuator may comprise a housing and a plunger. The housing may include a first end and a second end. The first end of the housing may define a first cable opening. The first cable opening may include a first portion with a first diameter and a second portion with a second diameter. The second diameter may be less than the first diameter. The plunger may have a head and a shaft extending from the head. The head of the plunger may be located in the housing and may be biased toward the first end of the housing.

In various embodiments, a biasing member may be configured to bias the bead of the plunger toward the first end of the housing.

In various embodiments, an end of the shaft opposite the head of the plunger may define a second cable opening. A diameter of a first opening portion of the second cable opening may be greater than a diameter of a second opening portion of the second cable opening. The first opening portion may be located closer to the second end of the housing as compared to the second opening portion.

In various embodiments, a load cell may be coupled to the plunger. In various embodiments, an end of the load cell may define a second cable opening. A diameter of a first opening portion of the second cable opening may be greater than a diameter of a second opening portion of the second cable opening. The first opening portion may be located closer to the second end of the housing as compared to the second opening portion.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 2A and 2B illustrate an arm restraint in a non-deployed position, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
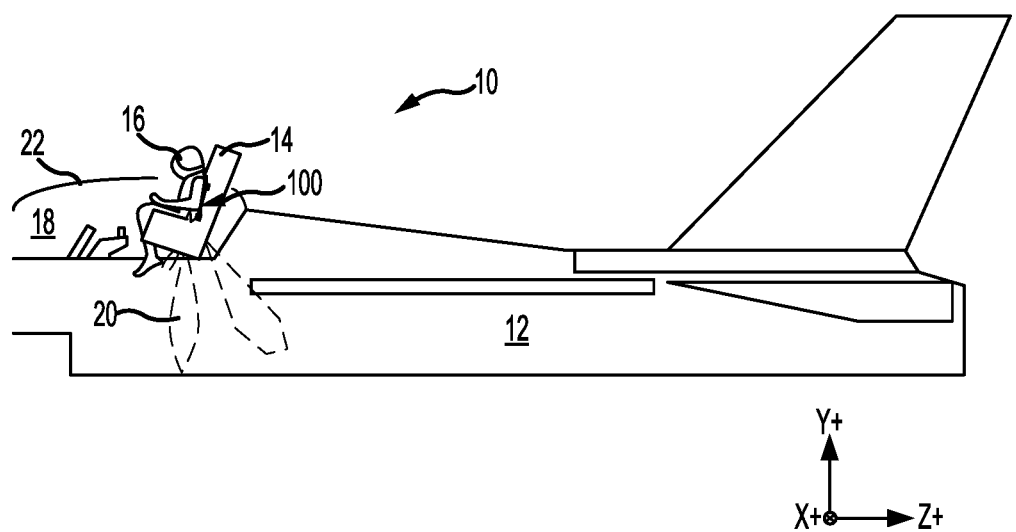
FIG. 1A illustrates an ejection seat being launched from an aircraft cockpit, in accordance with various embodiments.

With reference to FIG. 1A, an aircraft ejection system 10 is shown. In accordance with various embodiments, aircraft ejection system 10 may be installed in an aircraft 12 to expel an ejection seat 14 and an occupant 16 of ejection seat 14 from a cockpit 18 of aircraft 12. Ejection seat 14 may be urged from cockpit 18 by a propulsion system 20.

In accordance with various embodiments, ejection seat 14 includes an arm restraint assembly 100. Arm restraint assembly 100 may be configured to deploy while the arms of occupant 16 are located within cockpit 18. Stated differently, ejection system 10 may cause arm restraint assembly 100 to deploy prior to the arms of occupant 16 entering the wind stream outside of cockpit 18 (i.e., outside a canopy 22 of aircraft 12). Arm restraint assembly 100 is configured to limit rearward movement of the arms of occupant 16. Stated differently, in a deployed position, arm restraint assembly 100 may limit the arms of occupant 16 from moving aftward, toward the tail end of aircraft 12 (i.e., in the positive Z-direction on the provided XYZ axes).

Figure 1B:
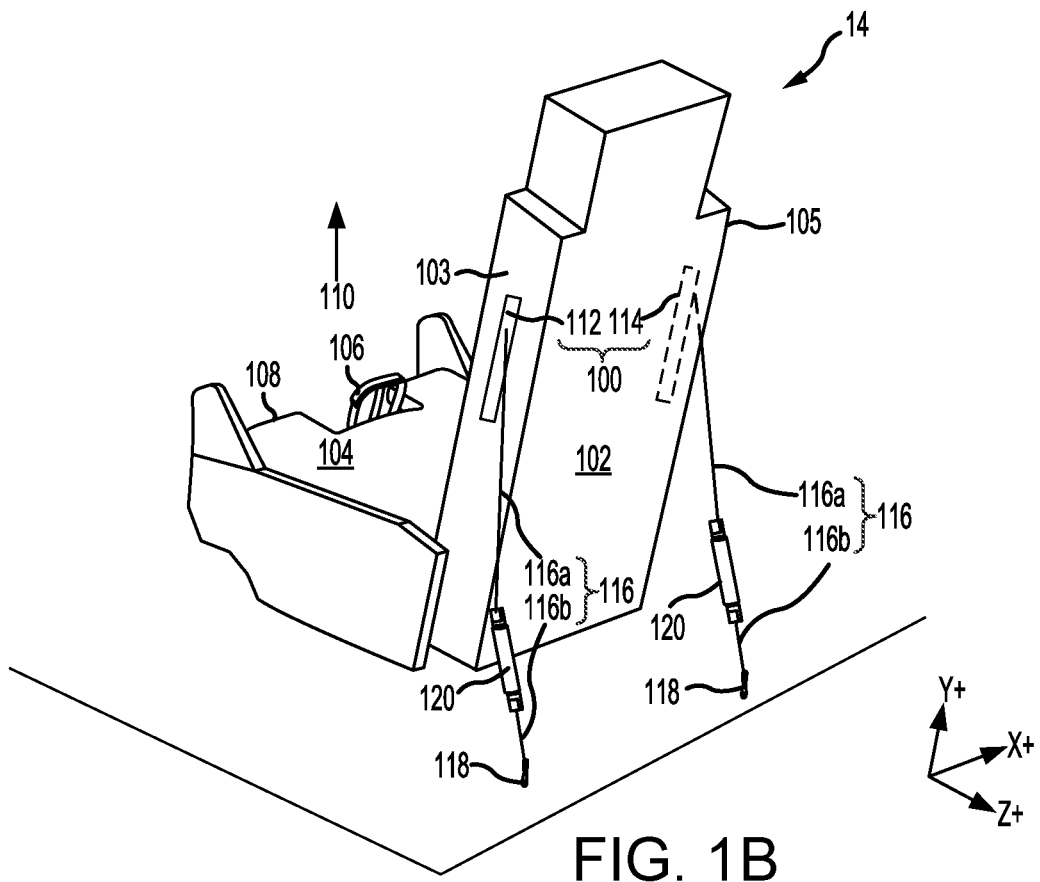
FIG. 1B illustrates an ejection seat having an arm restraint assembly, in accordance with various embodiments.

With reference to FIG. 1B, and continuing reference to FIG. 1A, ejection seat 14 is illustrated with arm restraint assembly 100 in a non-deployed position. Ejection seat 14 includes a seat back 102 and a seat pan 104. In various embodiments, an ejection handle 106 may be located proximate a frontside 108 of seat pan 104. Frontside 108 of seat pan 104 is generally opposite, or distal, seat back 102. While FIG. 1B shows ejection handle 106 located at frontside 108 of seat pan 104, it is further contemplated and understood that ejection handle 106 may be located anywhere that is accessible to an occupant of ejection seat 14. Ejection handle 106 may be configured to initiate an ejection sequence upon actuation. For example, occupant 16 (FIG. 1A) pulling ejection handle 106 in the direction of arrow 110 by may cause ejection seat 14 to be expelled from aircraft 12.

Ejection seat 14 includes arm restraint assembly 100. Arm restraint assembly 100 may include a left (or first) arm restraint 112 and a right (or second) arm restraint 114. Left and right arm restraints 112, 114 may be located at opposing sides of seat back 102. Left arm restraint 112 may be located proximate a left (or first) side panel 103 of seat back 102. Right arm restraint 114 may be located proximate a right (or second) side panel 105 of seat back 102. As described in further detail below, each of left arm restraint 112 and right arm restraint 114 includes one or more arm(s), or strut(s), configured to pivot relative to seat back 102. The arms of left and right arm restraints 112, 114 are each coupled, via an aircraft cable 116, to an anchor 118 within aircraft 12. Anchor 118 is attached to a stationary structure (e.g., a seat rail, a wall, a floor, etc.) within cockpit 18. Upon initiation of the ejection sequence, ejection seat 14 travels toward canopy 22 and away from anchor 118. As ejection seat 14 travels toward canopy 22, the coupling of aircraft cables 116 between anchors 118 and left and right arm restraints 112, 114 causes the arms of left and right arm restraints 112, 114 pivot, or otherwise rotate, to the deployed position.

In accordance with various embodiments, an attenuator 120 is coupled between each of left and right arm restraints 112, 114 and their respective anchor 118. For example, attenuator 120 is coupled between a first cable portion 116a and a second cable portion 116b of aircraft cable 116. In this regard, first cable portion 116a is coupled to attenuator 120 and to the arm of its respective arm restraint (i.e., to the arm of left arm restraint 112 or to the arm of right arm restraint 114), and second cable portion 116b is coupled to attenuator 120 and its respective anchor 118. As described in further detail below, attenuators 120 may allow the tension in aircraft cable 116 and/or the load applied by aircraft cable 116 to the arm restraint to increase gradually or in a generally linear manner. In this regard, attenuators 120 tend to reduce occurrences of load spikes. While arm restraint assembly 100 is described as having one attenuator 120 coupled to each of left arm restraint 112 and right arm restraint 114, it is further contemplated and understood that multiple attenuators 120 may be coupled, in series or in parallel, to each of left arm restraint 112 and right arm restraint 114.

With reference to FIGS. 2A and 2B, and continuing reference to FIG. 1B, left arm restraint 112 is illustrated in the non-deployed position. In FIG. 2B, left side panel 103 is removed to better illustrate the features of left arm restraint 112. While elements and functionalities of left arm restraint 112 are described in relation to FIGS. 2A and 2B, it is contemplated and understood that right arm restraint 114 is a mirror image of left arm restraint 112 and includes the elements and functionalities as described herein with respect to left arm restraint 112.

Left arm restraint 112 includes a primary (or first) arm 130. In various embodiments, left arm restraint 112 may include a secondary (or second) arm 140. In the non-deployed position, secondary arm 140 may be located between primary arm 130 and a net cover 150 and/or between primary arm 130 and left side panel 103. Net cover 150 may form a portion of seat back 102 and/or may be otherwise attached to seat back 102. In response to deployment of ejection seat 14, primary arm 130 and secondary arm 140 pivot relative to left side panel 103. Primary arm 130 is coupled to seat back 102 (e.g., to left side panel 103) via a primary arm bracket 132. Primary arm bracket 132 may be attached to left side panel 103 via pins, rivets, screws, clips, or any other securement device. Secondary arm 140 is coupled to seat back 102 (e.g., to left side panel 103) via a secondary arm bracket 142. Secondary arm bracket 142 may be attached to left side panel 103 via pins, rivets, screws, clips, or any other securement device. In various embodiments, primary arm bracket 132 and secondary arm bracket 142 are static structures, which do not pivot or otherwise rotate relative to seat back 102.

Primary arm 130 is rotationally coupled to primary arm bracket 132 via a primary arm pivot joint 134. During deployment of left arm restraint 112, primary arm 130 rotates relative to primary arm bracket 132 and about primary arm pivot joint 134. Secondary arm 140 may be rotationally coupled to secondary arm bracket 142 via a secondary arm pivot joint 144 (FIG. 3B). During the deployment of left arm restraint 112, secondary arm 140 rotates relative to secondary arm bracket 142 and about secondary arm pivot joint 144. In various embodiments, the axis of rotation about which primary arm 130 rotates is not parallel to the axis of rotation about which secondary arm 140 rotates.

In various embodiments, primary arm 130 includes a lock assembly 135 configured to limit a rotation of primary arm 130 about primary arm pivot joint 134. Lock assembly 135 may be configured to lock primary arm 130 in the fully-deployed position. Lock assembly 135 may be configured such that in response to primary arm 130 rotating a threshold number of degrees (e.g., 75°, 90°, 110°, etc.), lock assembly 135 prevents, or otherwise blocks, further rotation of primary arm 130 and prevents primary arm 130 from rotating in the opposite direction (i.e., toward secondary arm 140 and left side panel 103). In various embodiments, lock assembly 135 may include a tab 136 coupled to primary arm 130. In various embodiments, tab 136 may be located in an tab opening 137 defined by primary arm 130. Tab 136 is biased in a radially inward direction. Stated differently, tab 136 is biased toward primary arm pivot joint 134. Primary arm bracket 132 may define a tab groove 138. Tab groove 138 is configured to receive tab 136. Locating tab 136 in tab groove 138 generates an interference between tab 136 and primary arm bracket 132, thereby restricting rotation of primary arm 130 about primary arm pivot joint 134. In various embodiments, a location of tab groove 138 in primary arm bracket 132 is selected such that tab 136 will translate into tab groove 138 in response to primary arm 130 rotating the threshold, or predetermined, number of degrees (e.g., 75°, 90°, 110°, etc.).

Figure 3A:
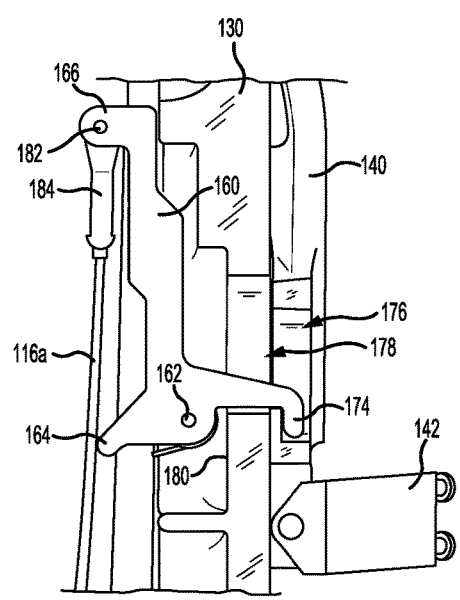
FIGS. 3A and 3B illustrate a latch of an arm restraint in a non-deployed position and a partially deployed position, respectively, in accordance with various embodiments.
Figure 3B:
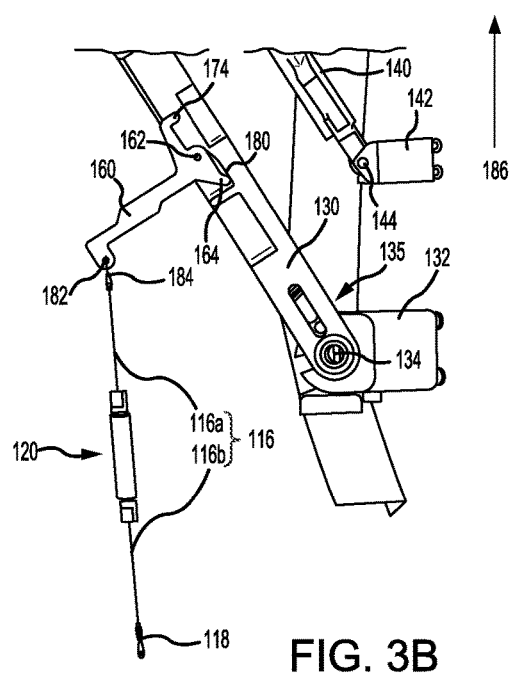

With additional reference to FIG. 3A, in accordance with various embodiments, left arm restraint 112 includes a latch 160. Latch 160 is rotationally coupled to primary arm 130 via a latch pivot joint 162. Latch 160 may rotate, relative to primary arm 130, via latch pivot joint 162. First cable portion 116a may be attached to a head end 166 of latch 160. During expulsion of ejection seat 14 from cockpit 18, with momentary reference to FIG. 1A, the coupling of first cable portion 116a to latch 160 causes latch 160 to rotate about latch pivot joint 162.

Latch 160 may include one or more leg(s) 164. In the non-deployed position, legs 164 may extend away from primary arm 130. Head end 166 of latch 160 may be located opposite, or distal, latch pivot joint 162 and legs 164. In various embodiments, latch 160 may include a hook portion 174. Hook portion 174 may be located approximately 90°, about latch pivot joint 162, from head end 166 of latch 160. As used in the previous context only, "approximately means±10°. Hook portion 174 may be located approximately 180°, about latch pivot joint 162, from legs 164. As used in the previous context only, "approximately means±10°. In various embodiments, secondary arm 140 may define a secondary latch orifice 176 configured to receive hook portion 174. Primary arm 130 may define a primary latch orifice 178. In the non-deployed position (FIG. 3A), primary latch orifice 178 may be aligned with secondary latch orifice 176, and hook portion 174 of latch 160 may be located through primary latch orifice 178 and secondary latch orifice 176. In the non-deployed position, hook portion 174 may engage, or contact, a secondary arm 140 and secure primary arm 130 to secondary arm 140. Stated differently, an interference generated between hook portion 174 and secondary arm 140 may block and/or prevent rotation of primary arm 130 and secondary arm 140 away from left side panel 103 and seat back.

With additional reference to FIG. 3B, during deployment of left arm restraint 112, latch 160 rotates about latch pivot joint 162, and head end 166 of latch 160 rotates away from primary arm 130, while legs 164 rotate toward primary arm 130. As latch 160 rotates about latch pivot joint 162, hook portion 174 translates out of secondary latch orifice 176 and primary latch orifice 178, thereby allowing primary arm 130 to separate from (i.e., rotate away from) secondary arm 140.

In various embodiments, a shear pin 182 may be coupled to latch 160. A terminal end 184 of first cable portion 116a may be coupled to shear pin 182. Shear pin 182 may extend between a pair of lugs on head end 166 of latch 160. Terminal end 184 of first cable portion 116a is attached to shear pin 182. In various embodiments, shear pin 182 may be located through terminal end 184 of first cable portion 116a. In various embodiments, terminal end 184 may comprise a ball and socket joint. For example, a spherically-shaped portion of first cable portion 116a may be located within a socket (i.e., orifice) defined by terminal end 184. A ball and socket joint may allow multidirectional movement and rotation of first cable portion 116a relative to terminal end 184 and to latch 160.

Upon initiation of the ejection sequence, ejection seat 14 (FIG. 1B) translates away from anchor 118 (i.e., in the direction of arrow 186) causing terminal end 184 to pivot about shear pin 182 and latch 160 to rotate about latch pivot joint 162. Latch 160 rotates about latch pivot joint 162 until legs 164 contact interference surface 180 of primary arm 130. The load from aircraft cable 116 along with the interference between legs 164 of latch 160 and interference surface 180 causes primary arm 130 to rotate about primary arm pivot joint 134. Primary arm 130 rotates about primary arm pivot joint 134 until tab 136 translates into groove 138, thereby restricting further rotation of primary arm 130.

Returning to FIG. 2B, left arm restraint 112 further includes a netting 190. Netting 190 may be coupled to primary arm 130. Netting 190 may comprise rope, ribbon, webbing, string, etc. Netting 190 may be formed from polyaramid paraphenylene terephthalamide (PPTA), nylon, ballistic nylon, polypropylene, polyester, cotton, metal, metal alloy, or other suitable material. In the non-deployed position, netting 190 is located within net cover 150 (i.e., proximate left side panel 103 of seat back 102, with momentary reference to FIG. 2A). In various embodiments, net cover 150 may define a channel 152. Channel 152 may house portions of netting 190 prior to deployment of left arm restraint 112.

As primary arm 130 rotates about primary arm pivot joint 134, netting 190 is drawn out of channel 152 and away from net cover 150. In various embodiments, a portion of netting 190 may be coupled to secondary arm 140. As primary arm 130 pulls netting 190 out of net cover 150, netting 190 may force secondary arm 140 to rotate away from net cover 150 and seat back 102.

Figure 4:
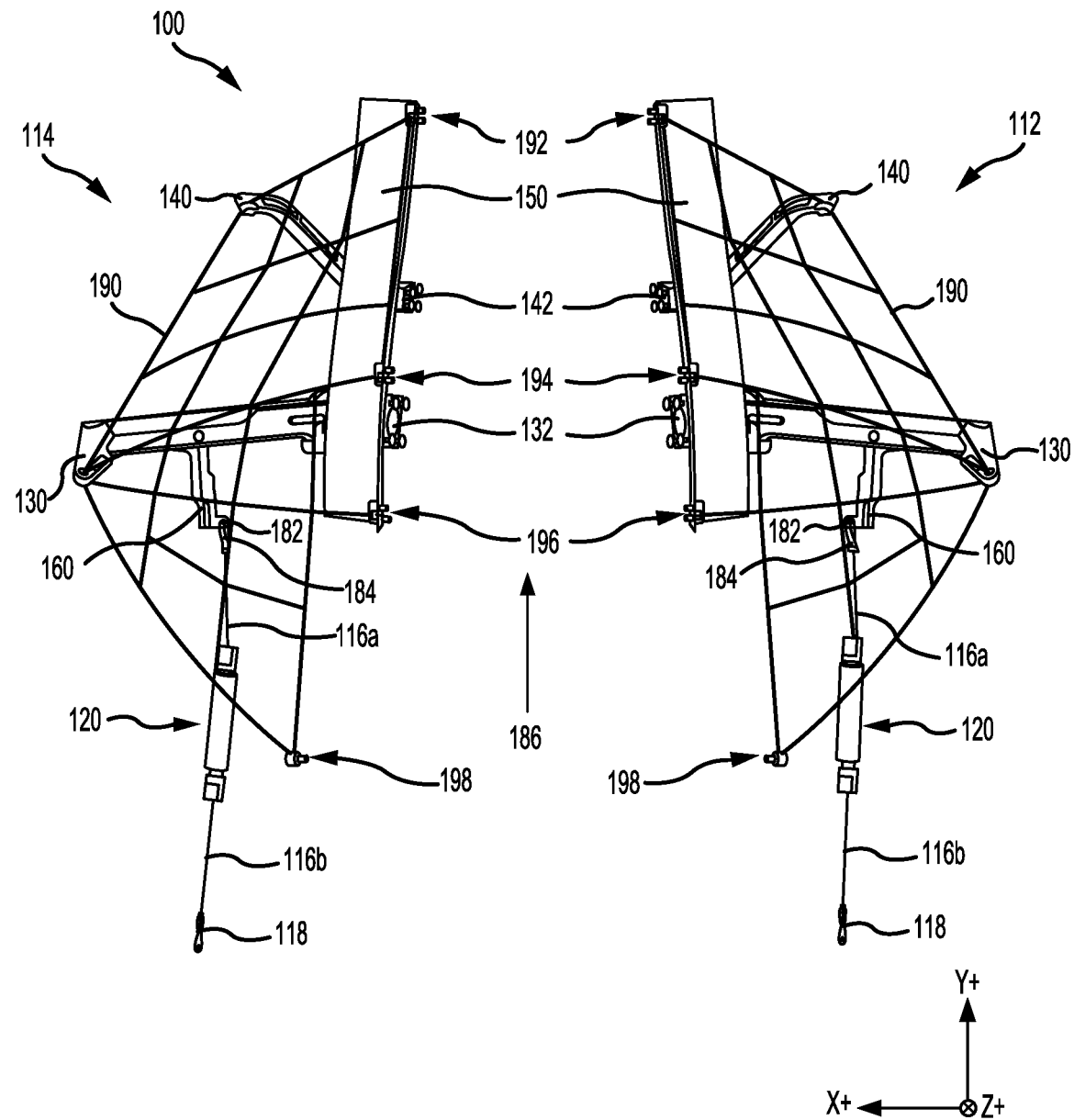
FIG. 4 illustrates an arm restraint assembly in a fully-deployed position with the arm restraints connected to an anchor and an attenuator, and with the attenuator in a non-extended position, in accordance with various embodiments.

FIG. 4 illustrates arm restraint assembly 100 with left arm restraint 112 and right arm restraint 114 in a fully-deployed position and coupled to their respective anchor 118. In FIG. 4, seat back 102 and seat pan 104 have been removed to better illustrate the features of arm restraint assembly 100. In the fully-deployed position, tab 136, with momentary reference to FIG. 2A, is located within groove 138. Locating tab 136 within groove 138 prevents primary arm 130 from rotating about primary arm pivot joint 134.

In the fully deployed position, netting 190 is drawn taut between primary arm 130 and one or more netting brackets, for example, between primary arm 130 and netting brackets 192, 194, 196, 198. In various embodiments, netting 190 may be coupled to ejection seat 14 (FIG. 1B) via netting brackets 192, 194, 196, 198. In various embodiments, netting brackets 192, 194, and 196 may be attached to seat back 102, with momentary reference to FIG. 1B, and netting brackets 198 may be attached to seat pan 104. Netting brackets 192, 194, 196, 198 may be attached to ejection seat 14 via pins, rivets, screws, clips, or any other securement device. In the fully-deployed position, netting 190 may restrict rearward arm movement of the arms of occupant 16, with momentary reference to FIG. 1A.

With left and right arm restraints 112, 114 in the fully-deployed position, the load applied to shear pin 182 by first cable portion 116a increases due to the ejection seat 14 continuing to translate away from anchor 118 (i.e., in the direction of arrow 186) and the rotation of primary arm 130 being restricted. Stated differently, with lock assembly 135 restricting further rotation of primary arm 130 and the ejection seat 14 continuing to translate in the direction of arrow 186, the load exerted by first cable portion 116a on shear pin 182 increases. As described in further detail below, attenuator 120 is configured to allow the tension in aircraft cable 116 and the load applied by first cable portion 116a to sheer pin 182 to increase in more gradual and generally linear manner.

Figure 5A:
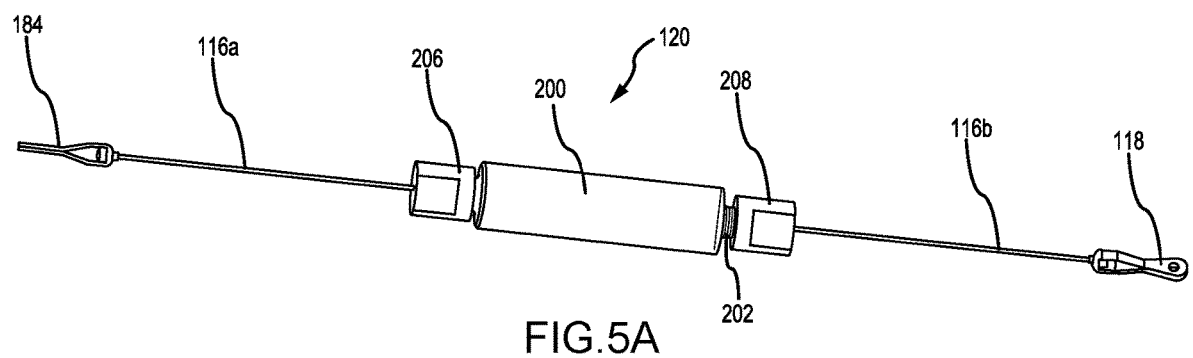
FIGS. 5A, 5B, 5C, and 5D illustrate an attenuator, in accordance with various embodiments.
Figure 5B:
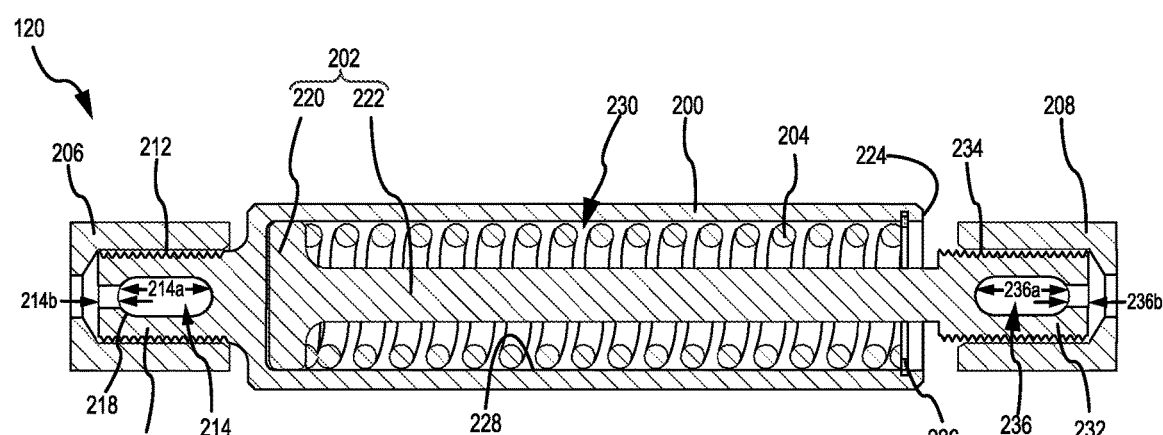

FIG. 5A shows a perspective view of attenuator 120 coupled between first cable portion 116a and second cable portion 116b. FIG. 5B illustrates a cross-section view of attenuator 120. With combined reference to FIGS. 5A and 5B, in accordance with various embodiments, attenuator 120 includes a housing 200 and a plunger 202. First cable portion 116a and a first end cap 206 may be coupled to housing 200. Second cable portion 116b and a second end cap 208 may be coupled to plunger 202.

Figure 5C:
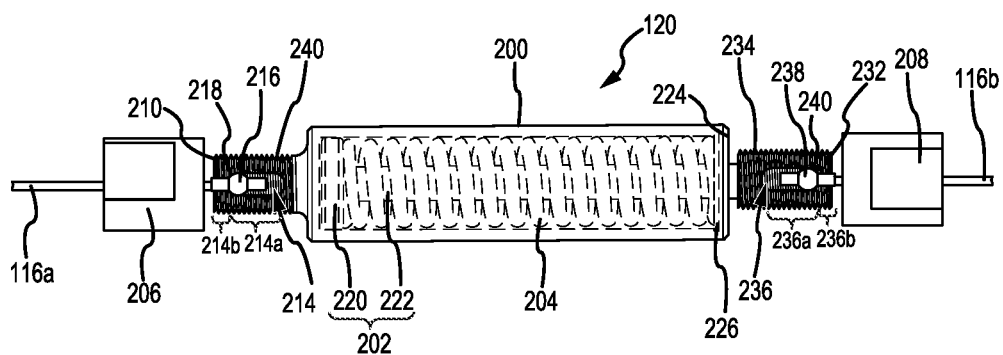
Figure 5D:
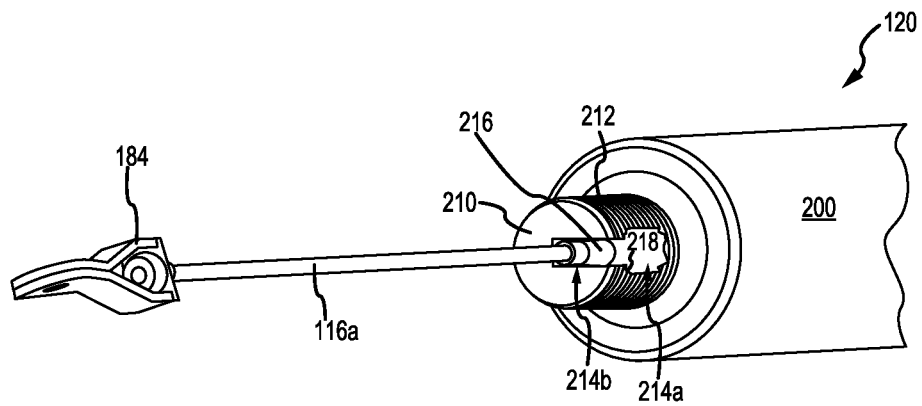

In various embodiments, a first end 210 of housing 200 may define a threaded surface 212 configured to engage a threaded surface of first end cap 206. First end 210 of housing 200 may further define a cable opening 214. With additional reference to FIG. 5C and FIG. 5D, cable opening 214 may extend to threaded surface 212. A first opening portion of 214a of cable opening 214 may have a larger diameter than a second opening portion 214b of cable opening 214. First opening portion 214a may be configured to receive a ball end 216 of first cable portion 116a. First cable portion 116a may extend from ball end 216 through second opening portion 214b. A diameter of ball end 216 is greater than a diameter of first cable portion 116a and greater than a diameter of second opening portion 114b. The larger diameter of ball end 216 relative to second opening portion 114b generates an interference between ball end 216 and an internal surface 218 of first end 210 of housing 200. Internal surface 218 of first end 210 is generally opposite threaded surface 212 and defines, at least, a portion of first opening portion 214a. The interference between ball end 216 and first end 210 allows for load transfer between first cable portion 116a and housing 200. To attach housing 200 to first cable portion 116a, ball end 216 is translated (i.e., slid) from threaded surface 212 into first opening portion 214a and first cable portion 116a is translated from threaded surface 212 into second opening portion 214b. After locating ball end 216 in first opening portion 114a, first end cap 206 is slid along first cable portion 116a toward first end 210 of housing 200. First end cap 206 is then rotated about threaded surface 212 to engage (i.e., secure) first end cap 206 to first end 210 of housing 200.

Returning to FIGS. 5A and 5B, plunger 202 includes a head 220 and a shaft 222 extending from head 220. A diameter, or width, of head 220 is greater than a diameter, or width, of shaft 222. Head 220 of plunger 202 is biased toward first end 210 of housing 200.

In various embodiments, a biasing member 204 may apply a biasing load to head 220. Biasing member 204 may be located around shaft 222. In various embodiments, biasing member 204 comprises a compression spring configured to bias head 220 toward first end 210 of housing 200 and away from a second end 224 of housing 200. Second end 224 of housing 200 is opposite first end 210 of housing 200. While biasing member 204 is illustrated as a compression spring located between head 220 and second end 224, it is further contemplated and understood that attenuator 120 may employ other biasing means members. For example, in various embodiments, biasing member 204 may comprise a tension spring coupled between head 220 and first end 210 and configured to bias head 220 toward first end 210. In various embodiment, a fluid may be employed to bias head 220 of plunger 202 toward first end 210 of housing 200.

In various embodiments, a retaining ring 226 (e.g., a circlip, also referred to as a snap ring or a c-clip) may be located proximate second end 224 of housing 200. For example, an internal surface 228 of housing 200 may define a ring groove configured to receive retaining ring 226. Biasing member 204 may be located between and may contact head 220 of plunger 202 and retaining ring 226. In accordance with various embodiments, biasing member 204, head 220, and at least a portion of shaft 222 are located within housing 200. In this regard, internal surface 228 of housing 200 may define a plunger chamber 230 configured to receive and house biasing member 204, head 220, and at least a portion of shaft 222.

In various embodiments, an end 232 of shaft 222 (also referred to herein as "shaft end") may define a threaded surface 234. Threaded surface 234 is configured to engage a threaded surface of second end cap 208. Shaft end 232 is opposite head 220. Shaft end 232 may further define a cable opening 236. With additional reference to FIG. 5C, cable opening 236 may extend to threaded surface 234. A first opening portion of 236a of cable opening 236 may have a larger diameter than a second opening portion 236b of cable opening 236. First opening portion 236a may be configured to receive a ball end 238 of second cable portion 116b. Second cable portion 116b may extend from ball end 238 through second opening portion 236b. A diameter of ball end 238 is greater than a diameter of second cable portion 116b and greater than a diameter of second opening portion 136b. The larger diameter of ball end 238 relative to second opening portion 136b generates an interference between ball end 238 and an internal surface 240 of shaft end 232. Internal surface 240 of shaft end 232 is generally opposite threaded surface 234 and defines, at least, a portion of first opening portion 236a. The interference between ball end 238 and shaft end 232 allows load transfer between second cable portion 116b and plunger 202. To attach plunger 202 to second cable portion 116b, ball end 238 is translated (i.e., slid) from threaded surface 234 into first opening portion 236a and second cable portion 116b is translated from threaded surface 234 into second opening portion 236b. After locating ball end 238 in first opening portion 136a, second end cap 208 is slid along second cable portion 116b toward shaft end 232 of plunger 202. Second end cap 208 is then rotated about threaded surface 234 to engage (i.e., secure) second end cap 208 to shaft end 232 of plunger 202.

While first end cap 206 and second end cap 208 are described as being coupled to housing 200 and shaft 222, respectively, via a threaded coupling, it is contemplated and understood that other means of attachment may be employed. For example, in various embodiments, first end cap 206 may be a spring-loaded end cap that is biased toward the closed position (i.e., biased toward housing 200, plunger head 220, and second end cap 208). In the closed position, first end cap 206 covers cable opening 214. The spring-loaded end cap can be translated away from first end 210 of housing 200 by applying a force greater than the biasing load to expose cable opening 214. After locating ball end 216 of first cable portion 116a in cable opening 214, the spring-loaded end cap is released. The spring-loaded end cap will automatically return to the closed position when end cap is released (i.e., when the force applied to the end cap is less than the biasing force). Similarly, second end cap 208 may be a spring-loaded end cap that is biased toward the closed position (i.e., biased toward shaft 222, plunger head 220, and first end cap 206). In the closed position second end cap 208 covers cable opening 236.

Figure 6A:
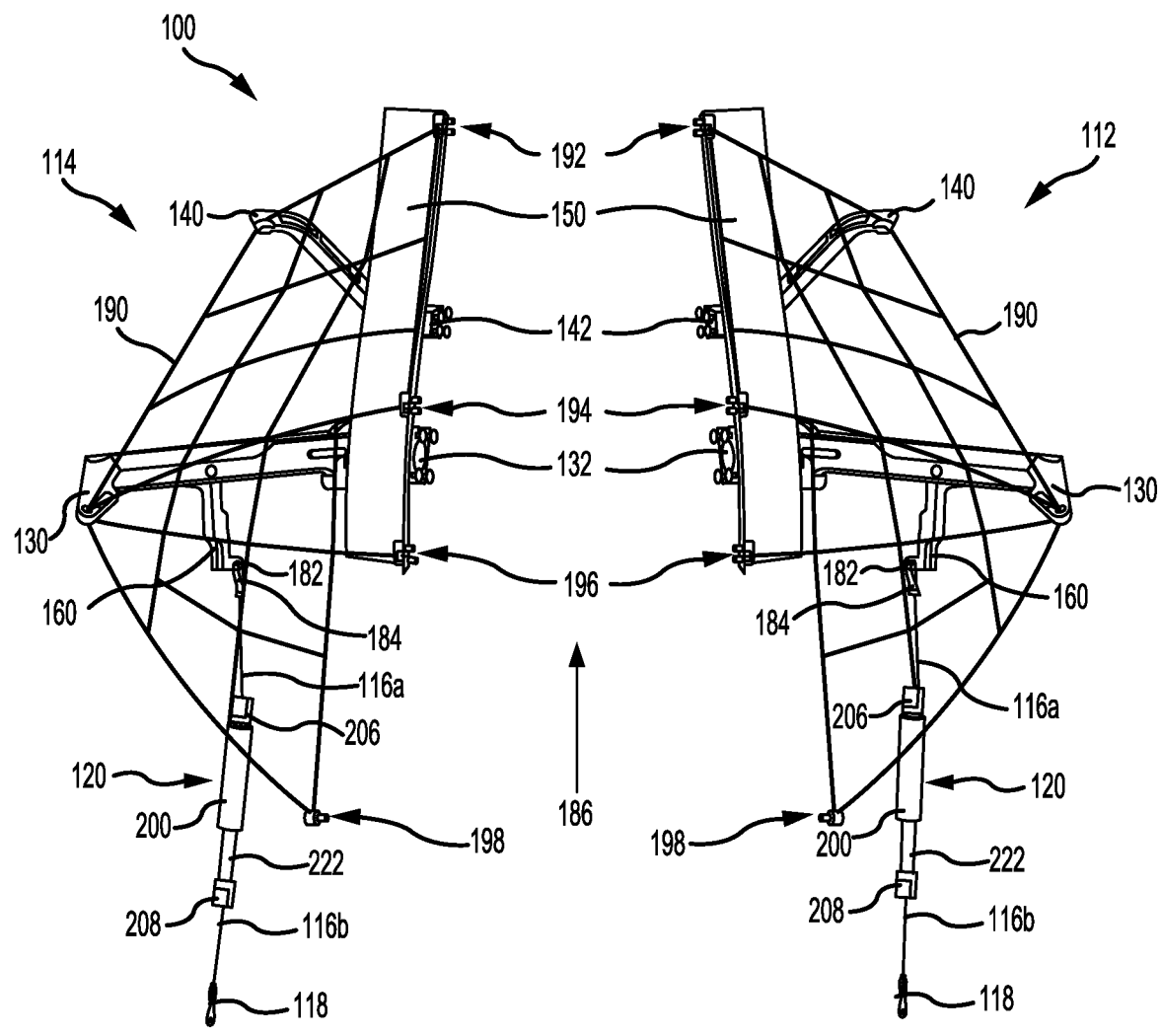
FIG. 6A illustrates an arm restraint assembly in a fully-deployed position with the arm restraints connected to an anchor and an attenuator, with the attenuator in an extended position, in accordance with various embodiments.

FIG. 6A shows arm restraint assembly 100 with left arm restraint 112 and right arm restraint 114 in the fully-deployed position and with attenuators 120 in an extended state. In FIG. 6A, seat back 102 and seat pan 104 have been removed to better illustrate the features of arm restraint assembly 100. With combined reference to FIG. 6A and FIG. 5B, in accordance with various embodiments, as ejection seat 14 (FIG. 1B) translates out of the cockpit and away from anchors 118, the distance between latches 160 and anchors 118 increases, thereby increasing the tension in aircraft cable 116. In response to the load applied by first cable portion 116a to housing 200 and the load applied by second cable portion 116b to plunger 202 exceeding the spring force of biasing member 204, head 220 of plunger 202 begins to translate towards second end 224 of housing 200, thereby compressing biasing member 204 between head 220 and retaining ring 226. As biasing member 204 compresses, a distance between first end cap 206 and second end cap 208 increases. The spring constant of biasing member 204—e.g., the diameter of biasing member 204, the material of biasing member 204, the number of turns of biasing member 204 about shaft 222, etc.—(or the damping coefficient in embodiments where attenuator 120 employs fluid as a biasing medium) is selected and the tensile strengths of retaining ring 226, housing 200, and plunger 202 are configured and/or selected to cause biasing member 204 to fully compress prior to shear pin 182 breaking. In this regard, with biasing member 204 at its solid height (i.e., fully compressed), the load applied to shear pin 182 by first cable portion 116a will continue to increase until a threshold load of shear pin 182 is reached.

Figure 6B:
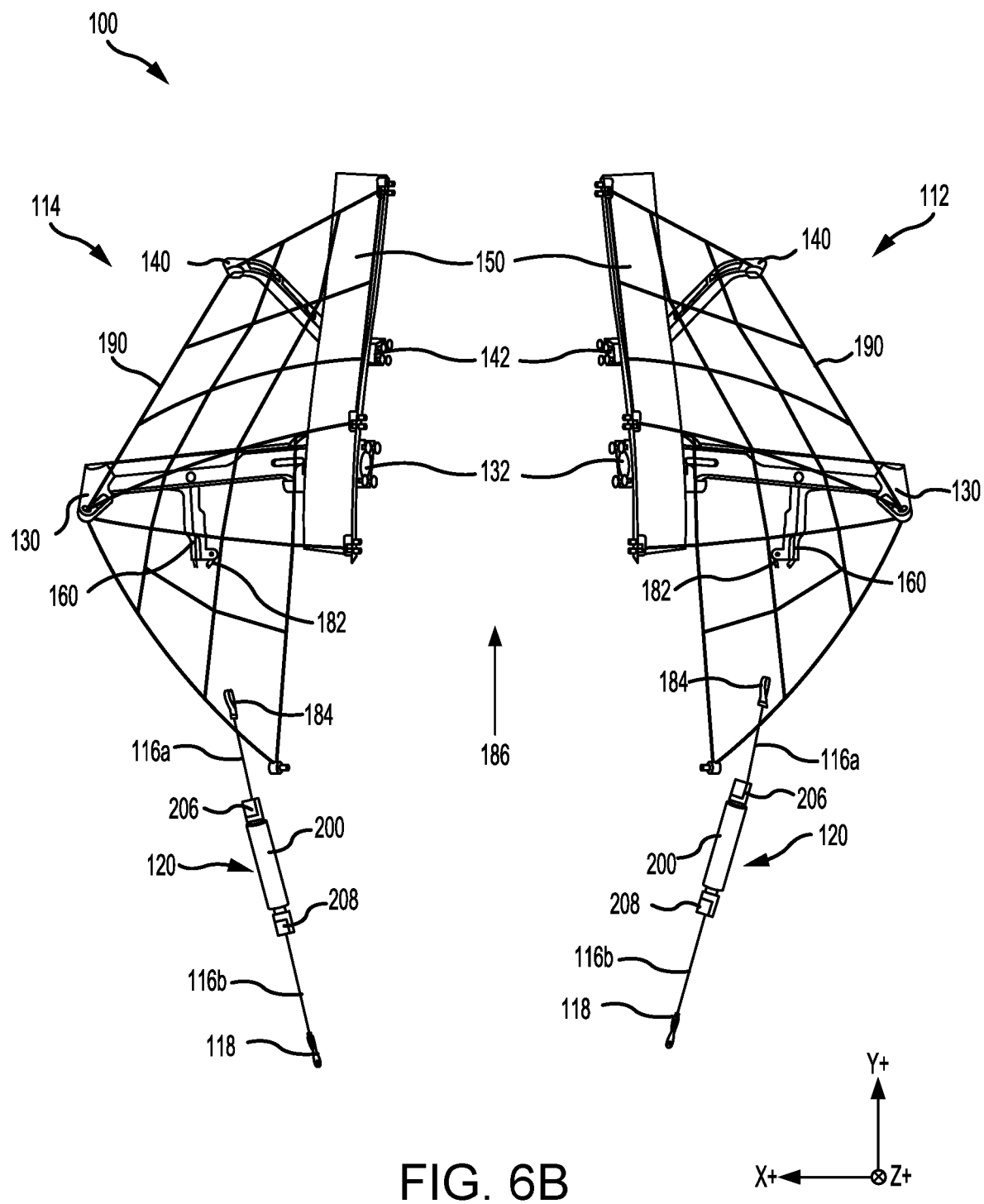
FIG. 6B illustrates an arm restraint assembly in a fully-deployed position with the arm restraints separated from their respective anchors, in accordance with various embodiments.

With additional reference to FIG. 6B, arm restraint assembly 100 is illustrated with left arm restraint 112 and right arm restraint 114 in a fully-deployed position and separated (i.e., decoupled) from their respective anchor 118. In accordance with various embodiments, the load applied by first cable portion 116a to sheer pin 182 increases until the load exceeds the threshold load of shear pin 182, at which point shear pin 182 will break, thereby releasing (i.e., uncoupling) latch 160 and primary arm 130 from first cable portion 116a and anchor 118. The threshold load of shear pin 182 is the minimum load associated with the sheering of shear pin 182. In this regard, sheer pin 182 is configured to sheer (i.e., break) in response to a load to equal to, or great than, the threshold load being applied to sheer pin 182. Stated differently, sheer pin 182 is configured to withstand loads less than the threshold load. In this regard, a tensile strength of the sheer pin 182 may be less than the tensile strength of latch 160 and/or less than the force of the interference created by tab 136 being located in tab groove 138, with momentary reference to FIG. 2A, and greater than load associated with compressing biasing member 204.

Coupling attenuator 120 between first cable portion 116a and second cable portion 116b allows the tension in aircraft cable 116 and the load applied to sheer pin 182 to increase in more gradual and generally linear manner. In this regard, attenuator 120 tends to reduce occurrences of load spikes and tends to increase the probability that the load applied to sheer pin 182 will exceed the threshold hold (i.e., sheer pin 182 will break) after primary arm 130 is fully deployed. Reducing occurrences of load spikes in aircraft cable 116 may also reduce the chances of aircraft cable 116 breaking before primary arm 130 has rotated to the fully deployed position. Increasing the probability that primary arm 130 will be in the fully deployed position increases seat occupant safety and reduces the chance for injury to the seat occupant.

While separation of primary arm 130 from anchor 118 is described as resulting from the breaking of sheer pin 182, it is further contemplated and understood that other means of separating latch 160 and primary arm 130 from anchor 118 may be employed by arm restraint assembly 100. For example, in various embodiments, first cable portion 116a may be configured to sever to separate latch 160 from anchor 118. In this regard, a tensile strength of first cable portion 116a may be less than the tensile strength of latch 160 and/or less than the force of the interference created by tab 136 being located in tab groove 138. The severing load of first cable portion 116a and the spring constant of biasing member 204 (or the damping coefficient for attenuators 120 employing a fluid biasing medium) are selected such that the biasing medium will fully compress prior to the tension in first cable portion 116a exceeding the severing load of first cable portion 116a (i.e., the load at which first cable portion will sever). In various embodiments, a cutter may be operably coupled to first cable portion 116a. The cutter may be configured to sever first cable portion 116a in response to the tensile load of first cable portion 116a exceeding a threshold cutter load. The threshold cutter load is selected to be reached after biasing member 204 has fully compressed. Stated differently, the spring constant of biasing member 204 (or the damping coefficient of a fluid biasing medium) is selected to cause the biasing member to compress prior to the tension in first cable portion 116a exceeding the threshold cutter load.

While attenuator 120 is described with reference to ejection seat arm restraint assemblies, it will be appreciated by those skilled in art that attenuator 120 may be employed in other aircraft cable assemblies. In this regard, attenuator 120 may be employed in any aircraft cable assembly to produce generally linear tension increase in the aircraft cable assembly and/or to reduce occurrences of load spikes in the aircraft cable assembly.

Figure 7A:
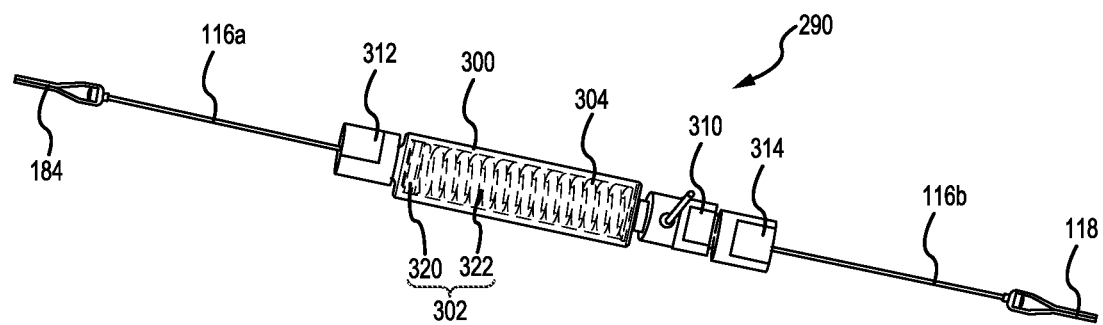
FIGS. 7A and 7B illustrate an attenuator with a load cell coupled to the attenuator, in accordance with various embodiments.

With reference to FIG. 7A, an attenuator 290, similar to attenuator 120 in FIGS. 5A and 5B, is illustrated. Attenuator 290 includes a housing 300 and a plunger 302. Plunger 302 incudes a head 320 and a shaft 322 extending from head 320. Head 320 of plunger 302 is biased toward a first end cap 312 and a first end of housing 300. In various embodiments, attenuator 290 includes a biasing member 304 configured to bias head 320 of plunger 302 toward first end cap 312 and the first end of housing 300. In various embodiments, attenuator 290 may include a fluid configured to bias head 320 of plunger 302 toward first end cap 312 and the first end of housing 300.

In accordance with various embodiments, attenuator 290 further includes a load cell 310. Load cell 310 is coupled between second cable portion 116b and plunger 302. Load cell 310 may be configured to measure tension. In this regard, the tension measured by load cell 310 may correspond to the tension of aircraft cable 116 and/or the load imparted on sheer pin 182 (FIG. 4) by first cable portion 116a during expulsion of the ejection seat. In various embodiments, first end cap 312 may be coupled to the first end of housing 300. A second end cap 314 may be coupled to load cell 310.

Figure 7B:
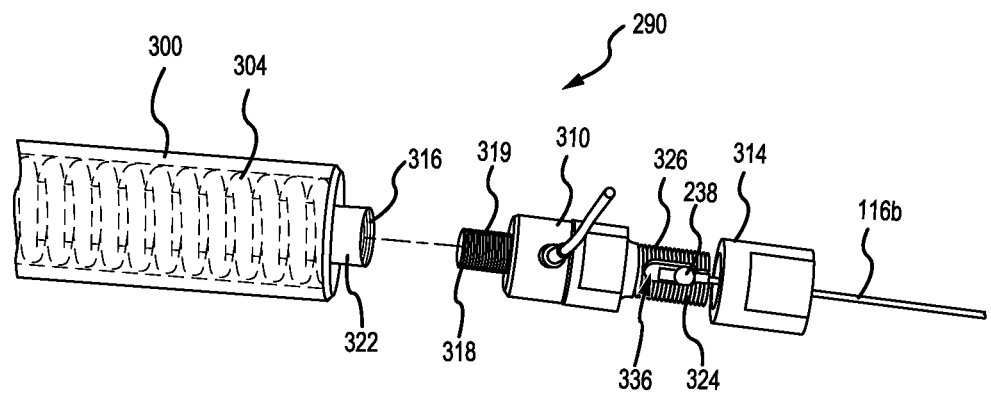

With additional reference to FIG. 7B, details of attenuator 290 are illustrated. In accordance with various embodiments, load cell 310 may engage a threaded surface 316 of plunger 302. Threaded surface 316 may be defined by shaft 322 of plunger 302. A first end 318 of load cell 310 (also referred to as "first load cell end") may define a threaded surface 319 configured to engage threaded surface 316 of plunger 302.

A second end 324 of load cell 310 (also referred to as "second load cell end") may define a threaded surface 326 configured to engage second end cap 314. Second load cell end 324 may define a cable opening 336, similar to cable opening 214 and cable opening 236 in FIGS. 5B and 5C. Cable opening 336 is configured to receive ball end 238 of second cable portion 116b. After locating ball end 238 in cable opening 336, second end cap 314 is slid along second cable portion 116b toward second load cell end 324. Second end cap 314 is then rotated about threaded surface 326 to engage (i.e., secure) second end cap 314 to second load cell end 324 of load cell 310. In various embodiments, second end cap 314 may be a spring-loaded end cap.

The interference between ball end 238 and second load cell end 324 allows loads to be transferred between second cable portion 116b and load cell 310. The coupling of load cell 310 to threaded surface 316 of shaft 322 facilitates the transfer of loads between load cell 310 and plunger 302.

With combined reference to FIG. 4 and FIG. 7A, in various embodiments, arm restraint assembly 100 may include attenuator 290 in place of one or more attenuator(s) 120. Coupling load cell 310 to attenuator 290 may allow for measurements and better understanding of the loads experienced by aircraft cable 116 and/or sheer pin 182 during ejection of the ejection seat 14 (FIG. 1B). The spring constant of biasing member 304 (or the damping coefficient of the fluid biasing medium), the tensile strength of aircraft cable 116, and/or the tensile strength of sheer pin 182 may be selected and/or adjusted based on the measurements obtained from load cell 310. In this regard, the spring constant of biasing member 304 (or the damping coefficient), the tensile strength of aircraft cable 116, and/or the tensile strength of sheer pin 182 may be selected to increase a likelihood that arm restraint assembly 100 will fully deploy prior to separation from anchors 118.

While attenuator 290 is described with reference to ejection seat arm restraint assemblies, it will be appreciated by those skilled in art that attenuator 290 may be employed in other aircraft cable assemblies. In this regard, attenuator 290 may be employed in any aircraft cable assembly to measure tension experienced by the aircraft cable assembly and/or to reduce occurrences of load spikes in the aircraft cable assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An arm restraint assembly for an ejection seat, comprising:
   a primary arm configured to pivot about a primary arm pivot joint;
   a first cable portion coupled to the primary arm and configured to pivot the primary arm about the primary arm pivot joint; and
   an attenuator coupled to the first cable portion, the attenuator including:
   a housing; and
   a plunger having a head located in the housing, wherein the head of the plunger is biased toward a first end of the housing,
   wherein the first cable portion is located in a first cable opening defined by the first end of the housing,
   wherein the arm restraint assembly for an ejection seat further comprises:
   a biasing member located in the housing, wherein the biasing member is configured to bias the head of the plunger toward the first end of the housing;
   a second cable portion coupled to the plunger; and
   a load cell coupled between the plunger and the second cable portion,
   the second cable portion being attached to the load cell in a second cable opening of the load cell.

2. The arm restraint assembly of claim 1, wherein the plunger further comprises a shaft extending from the head, and wherein the second cable portion is located in a second cable opening defined by the shaft.

3. An ejection seat, comprising:
   a seat back; and
   an arm restraint assembly coupled to the seat back, the arm restraint assembly comprising:
   a primary arm configured to pivot relative to the seat back;
   a first cable portion coupled to the primary arm and configured to pivot the primary arm about a primary arm pivot joint, wherein the first cable portion is located in a first cable opening defined by the first end of the housing; and
   an attenuator coupled to the first cable portion, the attenuator including a housing and a plunger located, at least partially, in the housing, wherein a head of the plunger is biased toward a first end of the housing,
   the ejection seat further comprising:
   a biasing member located in the housing, wherein the biasing member is configured to bias the head of the plunger toward the first end of the housing;
   a second cable portion coupled to the plunger; and
   a load cell coupled between the plunger and the second cable portion, the second cable portion being attached to the load cell in a second cable opening of the load cell.

4. The ejection seat of claim 3, wherein the attenuator further comprises:
   a retaining ring located in the housing; and
   a biasing member located between the retaining ring and the head of the plunger.

5. The ejection seat of claim 3, further comprising an anchor coupled to the second cable portion, the anchor being configured to attach to a stationary structure.

6. The ejection seat of claim 3, wherein the plunger further comprises a shaft extending from the head, and wherein the second cable portion is located in a second cable opening defined by the shaft.

* * * * *